United States Patent [19]

Karl

[11] 3,931,089

[45] Jan. 6, 1976

[54] ACID COMPOSITIONS COMPRISED OF POLYMERIC 2-ACRYLAMIDO-2-METHYLPROPANESULFONIC ACID AS THICKENER

[75] Inventor: Curtis Lee Karl, Minneapolis, Minn.

[73] Assignee: General Mills Chemicals, Inc., Minneapolis, Minn.

[22] Filed: June 6, 1974

[21] Appl. No.: 476,975

[52] U.S. Cl. .............. 260/29.65 Q; 260/29.6 H; 260/29.6 HN; 260/79.3 MU
[51] Int. Cl.² ........................................ G08F 220/56
[58] Field of Search ...... 260/29.65 O, 29.6 HN, 260/79.3 MU, 29.6 H, 29.6

[56] References Cited
UNITED STATES PATENTS

| | | | |
|---|---|---|---|
| 2,558,030 | 6/1951 | Zisman et al. | 252/76 |
| 2,809,959 | 10/1957 | Roth | 260/29.65 Q |
| 3,238,141 | 3/1966 | Gatza | 260/29.65 Q |
| 3,332,904 | 7/1967 | La Combe et al. | 260/33.2 |

FOREIGN PATENTS OR APPLICATIONS

| | | |
|---|---|---|
| 2,153,392 | 5/1972 | Germany |
| 404,109 | 3/1943 | Italy |
| 1,536,863 | 9/1967 | France |

OTHER PUBLICATIONS

"Water Soluble Resins," Davidson & Sitting Editors, Reinhold, New York, 1962, p. 167.

*Primary Examiner*—Joseph L. Schofer
*Assistant Examiner*—Peter F. Kulkosky
*Attorney, Agent, or Firm*—Anthony A. Juettner; Patrick J. Span; Elizabeth Tweedy

[57] ABSTRACT

Acid solutions having pH values of about 2 or below and containing a homopolymer of 2-acrylamido-2-methylpropanesulfonic acid or a salt of the homopolymer.

4 Claims, No Drawings

ACID COMPOSITIONS COMPRISED OF POLYMERIC 2-ACRYLAMIDO-2-METHYLPROPANESULFONIC ACID AS THICKENER

This invention relates to viscous acid solutions. More particularly, this invention relates to compositions comprising a homopolymer or a salt of the homopolymer of 2-acrylamido-2-methylpropanesulfonic acid as a thickener, water and a mineral or carboxylic acid, said acid having a concentration such that the pH of the composition is between about 2 and 0.

SUMMARY OF INVENTION

The compositions included in the present invention are surprisingly stable at ambient and elevated temperatures. They comprise a homopolymer or a salt of the homopolymer of 2-acrylamido-2-methylpropanesulfonic acid in an amount of from about 0.05% to 5.0% by weight of the composition, mineral or carboxylic acid in a concentration to produce a pH of about 2 or below and water. The homopolymer and the alkali and aklaline earth metal salts of the homopolymer of 2-acrylamido-2-methylpropanesulfonic acid are very soluble in strong acid solutions. It has been found to produce high viscosities in acid concentrations of 15% (pH below the traditionally observed pH scale) by weight of acids such as hydrochloric acid. The viscosities developed have been found to be stable on standing for weeks at ambient temperatures. The compositions have been heated at temperatures of 65°C for ½ hour to 1 hour without destroying the after cooling viscosity. In addition, the homopolymer did not precipitate from strong acid solutions even upon addition of water or multi-valent ions such as the calcium ion. It has also been found that the viscosities of the compositions can be further increased by the use of certain alcohols as stabilizers. The compositions find utility particularly in cleaning formulations for minimizing of splashing and spattering and reducing mobility at the designated site, such as minimizing run-off from vertical surfaces. They are also adaptable to the controlled release of viscous acidic liquids, such as retarding the action of acids on limestone suring acidizing of oil wells.

BACKGROUND OF THE INVENTION

Polymers have frequently been used to thicken liquids. In strong acid solution, problems such as low viscosity yields, rapid viscosity deterioration, particularly at elevated temperatures, and precipitation of the polymer or their hydrolysis products through insolubilization or by multi-valent ion salts are encountered.

I have examined numerous compositions of acid and water containing water soluble polymers of both the natural and synthetic types. With the exception of the compositions containing the homopolymer or a salt of the homopolymer of 2-acrylamido-2-methylpropanesulfonic acid, I have not found any which did not suffer one or more of the above-mentioned problems in aqueous solutions having pH levels below about 2.

DETAILED DESCRIPTION OF THE INVENTION

The acids useful in the present invention include mineral acids such as hydrochloric acid, sulfuric acid, nitric acid and phosphoric acid and water soluble carboxylic acids having one to four carbon atoms, such as formic acid, acetic acid, oxalic acid, citric acid, butyric acid and succinic acid or mixtures thereof. The concentration of the acid or mixtures is in the order to produce pH levels of about 2 or below.

2-Acrylamido-2-methylpropanesulfonic acid is commercially available and is currently sold under the Trademark AMPS$^{TM}$ by the Lubrizol Corporation. It has the structural formula:

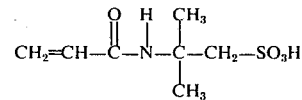

Polymerization of this monomer is known in the art and described by the Lubrizol Corporation as follows:

"The following recipes are given as a guide to the homopolymerization and copolymerization of AMPS (2-acrylamido-2-methylpropanesulfonic acid) monomer and its sodium salt. The polymerizations, except where noted otherwise, should be conducted in a resin flask equipped with a stirrer, gas inlet tube, condenser and thermometer. All solutions should be purged for one hour with nitrogen or argon before adding the initiator, with purging continued during the polymerization. All amounts are in grams.

| | |
|---|---|
| AMPS (2-acrylamido-2-methylpropane-sulfonic acid) Monomer | 100 |
| Distilled Water | 100 |
| Ferrous Sulfate Heptahydrate | 0.01 |
| Hydrogen Peroxide 0.05% Solution | 0.25 |

Prepare a solution of AMPS monomer in water in an 800 ml beaker. Purge. Add the ferrous sulfate and hydrogen peroxide. The solution gels almost instantly. The temperature rises to 75° - 80°C in about two minutes. Cool to room temperature. Cut gel into pieces and dry at 60°C in a vacuum oven."

I prepared the homopolymers used in the examples below illustrating my invention by dissolving the monomer at a concentration of 50% by weight solids in water and bubbling nitrogen through the mixture until polymerization began. The monomer was dissolved at ambient temperature and polymerization began within about 30 minutes. Polymerization was accompanied by an increase in temperature. The reaction was completed within 30 minutes. The resulting gel was then dried overnight in a vacuum oven at aspirator pressure and a temperature of about 50°C. Then the polymer was ground to powder. When monomers of high purity are used in amounts of about 50% by weight monomer in the polymerization, no catalyst is required to produce polymerization. A catalyst can be used, if desired.

An alternate method, when monomers of less purity or lesser solids concentration are used, is available. For example, 30% monomer by weight of the composition in water previously purged with nitrogen can be polymerized by adding aqueous solutions of potassium persulfate, potassium bisulfite and ferrous sulfate successively to initiate polymerization. The polymerization methods are well known in the art.

The compositions of this invention include the above homopolymer in an amount of about 0.05% to 5% by weight of the composition and, preferably, about 1% to 4% by weight of the composition. The homopolymer or a salt of the homopolymer of 2-acrylamido-2-methylpropanesulfonic acid is readily soluble in strong acid solutions, containing at least 25% water by weight of the composition, and can be incorporated into the compositions by merely mixing.

A further embodiment of the present invention includes incorporation into the composition an alcohol having 2 to 3 carbon atoms, such as isopropyl alcohol, allyl alcohol, propylene glycol, ethyl alcohol. These alcohols are preferably used in amounts at about 5% to 10% by weight of the composition.

Set out below are specific examples of the compositions of this invention and measurements of their rheological properties. The viscometer readings set out below were obtained using a Brookfield Viscometer fitted with a No. 3 spindle rotated at rpm shown below and at a temperature of 25°C.

EXAMPLE 1

This example illustrates the heat and time stability of the compositions of this invention.

The homopolymer prepared as described above in an amount to produce a concentration of 2% by weight of the composition was dissolved in a 30% by weight hydrochloric acid aqueous solution. The viscosity measurements obtained from this composition at various aging intervals were:

| Time | rpm | cps |
| --- | --- | --- |
| 24 hours | 20 | 920 |
| 24 hours | 100 | 480 |
| 1 week | 20 | 800 |

The viscosity measurements obtained from this composition upon heating for one hour at a temperature of 65°C and cooling back to room temperature are shown below. The composition had aged 24 hours at the time of heating.

| Before Heating | | After Cooling | |
| --- | --- | --- | --- |
| rpm | cps | rpm | cps |
| 20 | 920 | 20 | 1,000 |
| 100 | 480 | 100 | 490 |

Addition of water to the aged composition did not result in the formation of any precipitate.

EXAMPLE 2

The compositions shown below were made by the procedure of Example 1 and were aged at room temperature. The viscosity measurements obtained from these compositions are set out below. The rpm for each measurement was 20 rpm.

| Conc. % by weight homopolymer | Acid | Conc. by weight | pH | Aging Time | Viscosity cps |
| --- | --- | --- | --- | --- | --- |
| 4 | Hydrochloric Acid | 30 | Approx 0 | 24 hours | 7,400 |
| | | | | 336 hours | 7,400 |
| 1 | Hydrochloric Acid | 36 | Approx 0 | 24 hours | 175 |
| | | | | 672 hours | 160 |
| 1 | Hydrochloric Acid | 18 | Approx 0 | 24 hours | 135 |
| | | | | 672 hours | 145 |
| 3 | Phosphoric Acid ($H_3PO_4$) | 50 | Approx 0 | 24 hours | 9,800 |
| | | | | 81 hours | 9,800 |
| 3 | Sulfuric Acid | 10 | Approx 0 | 24 hours | 4,900 |
| | | | | 81 hours | 5,000 |
| 3 | Sulfuric Acid | 50 | Approx 0 | 24 hours | 2,800 |
| | | | | 72 hours | 2,700 |
| 3 | Nitric Acid | 50 | Approx 0 | 24 hours | 4,100 |
| | | | | 72 hours | 4,100 |
| 3 | Citric Acid | 22 | Approx 0 | 24 hours | 12,700 |
| | | | | 72 hours | 12,400 |
| 3 | Acetic Acid | 50 | Approx 0 | 24 hours | 10,250 |
| | | | | 72 hours | 10,100 |
| 3 | Oxalic Acid | 10 | Approx 0 | 24 hours | 4,600 |
| | | | | 70 hours | 2,000 |

Polymer precipitation did not occur when water was added to the aged composition. The polymer did not precipitate upon addition of a calcium ion.

EXAMPLE 3

This example illustrates the effect of including an alcohol in the acid composition. A composition containing 50% sulfuric acid by weight of the composition, 8% isopropyl alcohol by weight of the composition, 3% homopolymer of 2-acrylamido-2-methylpropanesulfonic acid by weight of the composition and 39% water by weight of the composition was prepared as described in Example 1. The viscosity measurement at 20 rpm after 24 hours was 3,000 cps and after 72 hours the viscosity measurement was 3,500 cps.

The embodiments of the invention in which an exclusive property or privilege is claimed are defined as follows:

1. A composition of matter comprising water in an amount of at least 25% by weight of the composition, an acid selected from the mineral acids, the water soluble carboxylic acids containing one to four carbon atoms and mixtures thereof in an amount to produce a pH level of about 2 or below, and a thickener selected from a homopolymer and the alkali and alkaline earth metal salts of the homopolymer of 2-acrylamido-2-methylpropanesulfonic acid in an amount of about 0.05% to 5.0% by weight of the composition.

2. The composition of claim 1 wherein an alcohol containing two to three carbon atoms is included in an amount of about 5% to 10% by weight of the composition.

3. The composition of claim 1 wherein the thickener is included in amounts of about 1% to 4% by weight of the composition.

4. The composition of claim 1 wherein the thickener is the homopolymer of 2-acrylamido-2-methylpropanesulfonic acid in an amount of about 1% to 4% by weight of the composition.

* * * * *